United States Patent
Cheng et al.

(10) Patent No.: US 9,031,772 B2
(45) Date of Patent: May 12, 2015

(54) ASSISTANCE SYSTEM AND GENERATION METHOD OF DYNAMIC DRIVING INFORMATION

(71) Applicant: Industrial Technology Research Institute, Hsinchu (TW)

(72) Inventors: Ming-Hsuan Cheng, Hsinchu (TW); Yin-Chih Lu, Tainan (TW); Ping-Fan Ho, Taipei (TW); Ming-Fong Tsai, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 22 days.

(21) Appl. No.: 13/911,358

(22) Filed: Jun. 6, 2013

(65) Prior Publication Data
US 2014/0278045 A1    Sep. 18, 2014

(30) Foreign Application Priority Data
Mar. 15, 2013 (TW) ............... 102109328 A

(51) Int. Cl.
| | |
|---|---|
| G05D 1/02 | (2006.01) |
| B60Q 1/00 | (2006.01) |
| G06F 17/10 | (2006.01) |
| B60W 30/00 | (2006.01) |

(52) U.S. Cl.
CPC ..................... B60W 30/00 (2013.01)

(58) Field of Classification Search
USPC .................. 701/300, 301; 340/435
See application file for complete search history.

(56) References Cited

U.S. PATENT DOCUMENTS

| | | | |
|---|---|---|---|
| 6,370,475 B1 * | 4/2002 | Breed et al. ............. | 701/301 |
| 6,405,132 B1 * | 6/2002 | Breed et al. ............. | 701/301 |
| 6,768,944 B2 * | 7/2004 | Breed et al. ............. | 701/301 |
| 7,049,945 B2 * | 5/2006 | Breed et al. ............. | 340/435 |
| 7,161,472 B2 * | 1/2007 | Strumolo et al. ......... | 340/436 |
| 7,295,925 B2 * | 11/2007 | Breed et al. ............. | 701/301 |
| 7,315,239 B2 | 1/2008 | Cheng et al. | |
| 7,359,782 B2 | 4/2008 | Breed | |
| 7,499,683 B2 | 3/2009 | Ogasawara | |

(Continued)

FOREIGN PATENT DOCUMENTS

| | | |
|---|---|---|
| CN | I239551 A | 12/1999 |
| TW | 541255 B | 7/2003 |

(Continued)

OTHER PUBLICATIONS

A. Jazayeri et al., "Vehicle Detection and Tracking in Car Video Based on Motion Model," IEEE Transactions on Intelligent Transportation Systems, vol. 12, No. 2, Jun. 2011, pp. 583-595.

(Continued)

Primary Examiner — Thomas G Black
Assistant Examiner — Tyler Paige
(74) Attorney, Agent, or Firm — Muncy, Geissler, Olds & Lowe, P.C.

(57) ABSTRACT

An assistance system and a generation method of dynamic driving information, which acquire object information of an ambient object near by a main vehicle to establish an ambient object relation list of the main vehicle, receive an ambient object relation list of an ambient vehicle, and determine object information of the ambient object relation list of the ambient vehicle before being added in the ambient object relation list of the main vehicle, so as to establish a dynamic driving information graph.

11 Claims, 3 Drawing Sheets

(56) References Cited

U.S. PATENT DOCUMENTS

| | | | |
|---|---|---|---|
| 7,783,403 B2 * | 8/2010 | Breed | 701/45 |
| 7,804,423 B2 | 9/2010 | Mudalige et al. | |
| 8,242,895 B2 | 8/2012 | Shen et al. | |
| 8,310,353 B2 * | 11/2012 | Hinninger et al. | 340/435 |
| 8,483,439 B2 * | 7/2013 | Camilleri et al. | 382/104 |
| 2004/0246113 A1 * | 12/2004 | Strumolo et al. | 340/435 |
| 2005/0073433 A1 * | 4/2005 | Gunderson et al. | 340/903 |
| 2005/0195383 A1 * | 9/2005 | Breed et al. | 356/4.01 |
| 2005/0278098 A1 * | 12/2005 | Breed | 701/45 |
| 2006/0250297 A1 * | 11/2006 | Prakah-Asante et al. | 342/70 |
| 2010/0169009 A1 | 7/2010 | Breed et al. | |
| 2011/0080277 A1 * | 4/2011 | Traylor et al. | 340/435 |
| 2012/0041632 A1 * | 2/2012 | Garcia Bordes | 701/29.1 |
| 2012/0130561 A1 | 5/2012 | Chiang | |
| 2013/0038735 A1 * | 2/2013 | Nishiguchi et al. | 348/148 |
| 2013/0198737 A1 * | 8/2013 | Ricci, Christopher P. | 717/174 |
| 2013/0335212 A1 * | 12/2013 | Purks et al. | 340/435 |

FOREIGN PATENT DOCUMENTS

| | | |
|---|---|---|
| TW | I287514 B | 10/2007 |
| TW | 201122714 A | 7/2011 |
| TW | 201133389 A | 10/2011 |
| TW | I356011 B | 1/2012 |
| TW | I363012 B | 5/2012 |
| TW | I365145 B1 | 6/2012 |
| TW | I392366 B1 | 4/2013 |
| WO | WO 98/47022 | 10/1998 |

OTHER PUBLICATIONS

L. Yang et al., "Technology of Vehicle Identification Based on Laser," $3^{rd}$ International Conference on Intelligent Human-Machine Systems and Cybernetics, 2011, pp. 160-164.

S.D. Dissanayake, et al., "Zigbee Wireless Vehicular Identification and Authentication System," ICIAFS08, 2008, pp. 257-260

T. Gandhi et al., "Vehicle Surround Capture: Survey of Techniques and a Novel Omni-Video-Based Approach for Dynamic Panoramic Surround Maps," IEEE Transactions on Intelligent Transportation Systems, vol. 7, No. 3, Sep. 2006, pp. 293-308.

T. Gandhi et al., "Video Based Surround Vehicle Detection, Classification and Logging from Moving Platforms: Issues and Approaches," IEEE Intelligent Vehicles Symposium, Jun. 13-15, 2007, pp. 1067-1071.

B. Morris et al., "Vehicle Iconic Surround Observer: Visualization Platform for Intelligent Driver Support Applications," IEEE Intelligent Vehicles Symposium, Jun. 21-24, 2010, pp. 168-173.

Y.L. Chen et al., "Vision-based Nighttime Vehicle Detection and Range Estimation for Driver Assistance," IEEE International Conference on Systems, Man and Cybernetics (SMC 2008), pp. 2988-2993.

* cited by examiner

ASSISTANCE SYSTEM AND GENERATION METHOD OF DYNAMIC DRIVING INFORMATION

CROSS-REFERENCE TO RELATED APPLICATIONS

This non-provisional application claims priority under 35 U.S.C. §119(a) on Patent Application No(s). 102109328 filed in Taiwan, R.O.C. on Mar. 15, 2013, the entire contents of which are hereby incorporated by reference.

TECHNICAL FIELD

The disclosure relates to an assistance system of driving information, more particularly to an assistance system capable of dynamically displaying driving information of ambient vehicle.

BACKGROUND

Human's view is limited by his natural sight and has many dead angles in driving. The faster the driving speed, the greater the dead angle is. Moreover, other vehicles easily obstruct human's view of remote coming vehicles in driving, resulting in driving risks easily. Besides a main vehicle, drivers in other objects may also have dead angles and be obstructed, resulting in more driving risks. If a driver can handle driving states of ambient vehicles and a relative distance between a barrier and the driver via an efficient assistance in driving, the driver can be easily guided to avoid traffic collision.

Present panoramic assistance system is a system capable of displaying ambient images of a vehicle. The panoramic assistance system uses an image fusion method so requires a great computing ability for image processing, However, the panoramic assistance system only provides a panoramic parking assistance in low speed because of its limited computing ability, and can not provide other assistances to notify a driver emergencies out of the view of driver in regular speed.

SUMMARY

An assistance system of dynamic driving information in the disclosure includes an ambient vehicle sensing unit, a wireless communication unit and a processing unit. The ambient vehicle sensing unit detects an ambient object near by a main vehicle to obtain object information of the ambient object. The wireless communication unit receives an ambient object relation list of an ambient vehicle. The processing unit establishes an ambient object relation list of the main vehicle according to the object information of the ambient object, and adds object information of the ambient object relation list of the ambient vehicle in the ambient object relation list of the main vehicle to generate a dynamic driving information graph.

A generation method of dynamic driving information in the disclosure includes the following steps. Firstly, object information of an ambient object near by a main vehicle is acquired. Subsequently, an ambient object relation list of the main vehicle is established according to the object information of the ambient object, and an ambient object relation list of an ambient vehicle is received. Object information of the ambient object relation list of the ambient vehicle is determined and then is added in the ambient object relation list of the main vehicle to generate a dynamic driving information graph.

An assistance system of dynamic driving information in the disclosure includes a wireless communication unit and a processing unit. The wireless communication unit receives an ambient object relation list from at least one ambient vehicle. The processing unit receives object information of at least one ambient object near by a main vehicle to establish an ambient object relation list of the main vehicle, and adds the object information of the ambient object relation list of the at least one ambient vehicle in the ambient object relation list of the main vehicle to generate a dynamic driving information graph

BRIEF DESCRIPTION OF THE DRAWINGS

The present disclosure will become more fully understood from the detailed description given herein below for illustration only and thus does not limit the present disclosure, wherein.

DETAILED DESCRIPTION

Figure 1:
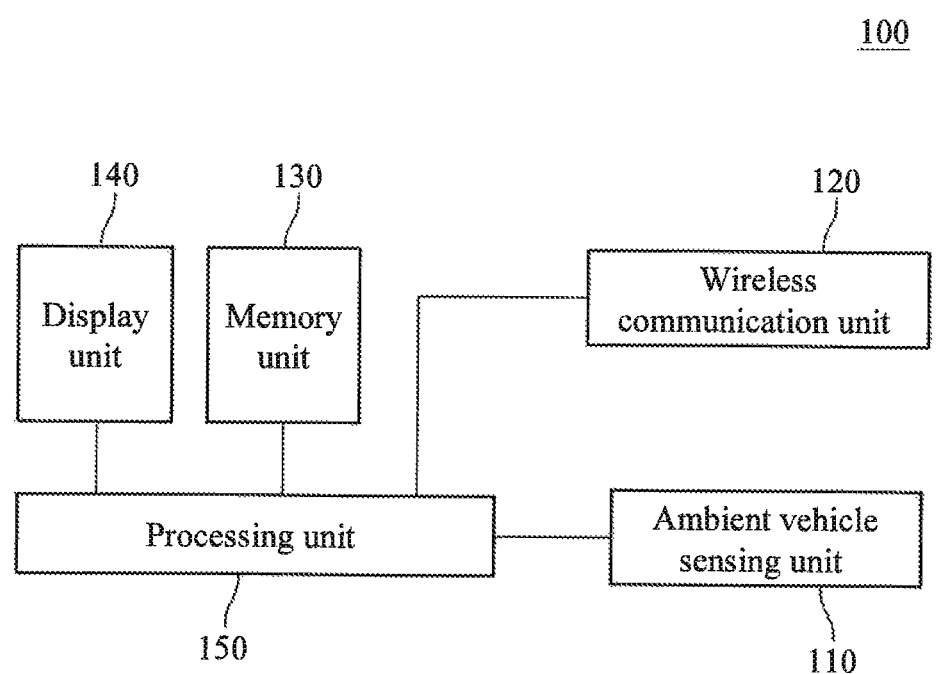
FIG. 1 is a structure diagram of an assistance system of dynamic driving information according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a structure diagram of an assistance system of dynamic driving information according to an embodiment of the disclosure. The disclosure provides an assistance system of dynamic driving information (also called an assistance system hereinafter) 100. The assistance system 100 can be disposed in any vehicle (a main vehicle), and continuously sense an object information, e.g. a relative distance and angle, of each ambient object near by the vehicle to establish an ambient object relation list. The ambient object can be a vehicle also having another assistance system 100, be a vehicle without any assistance system 100, be an unidentified and movable object which can not be considered as a vehicle, or be an unidentified and immovable object.

The assistance system 100 includes an ambient vehicle sensing unit 110, a wireless communication unit 120, a memory unit 130, a display unit 140 and a processing unit 150. The ambient vehicle sensing unit 110, the wireless communication unit 120, the memory unit 130 and the display unit 140 are respectively coupled to the processing unit 150.

The ambient vehicle sensing unit 110 detects an ambient object near by the main vehicle to obtain object information, e.g. a distance, an angle or a driving speed, of the ambient object. In an embodiment, the ambient vehicle sensing unit 110 can be a laser radar, an infrared-ray radar, a millimeter-wave radar, an image identification device, a short-range wireless device, or an optical communication device capable of detecting the location and angle of each ambient vehicle.

The wireless communication unit 120 receives or transmits wireless messages, that is, receives ambient object relation lists from ambient vehicles near by the main vehicle. The wireless communication unit 120 also regularly transmits a request and a response for vehicle states and ambient object relation lists. The memory unit 130 is coupled to the processing unit 150, and is configured to store object information of ambient objects and storing ambient object relation lists of ambient vehicles. The object information includes, for example, a relative distance between an ambient object (or an ambient vehicle) and the main vehicle, a relative angle that the ambient object is referred to the main vehicle, time that the ambient object is detected, a driving direction of the ambient object, or a driving speed of the ambient object. The display unit 140 is coupled to the processing unit 150, and is configured to display dynamic driving information graphs. In an embodiment, the display unit 140 further provides object information or security warnings.

The processing unit 150 computes and processes ambient object relation list, and controls and coordinates the wireless communication unit 120, the ambient vehicle sensing unit 110 and the memory unit 130. The processing unit 150 establishes a dynamic driving information graph according to relative information associated with the main vehicle and ambient vehicles and shows the dynamic driving information graph via the display unit 140 in real time, thereby assisting drivers. Specifically, the processing unit 150 establishes an ambient object relation list of the main vehicle according to the object information of each ambient object, determines the object information of the ambient object relation list of the ambient vehicle, and adds the determined object information in the ambient object relation list of the main vehicle to generate the dynamic driving information graph.

In some embodiments, the processing unit 150 determines the object information of the ambient object relation lists of the main vehicle and the ambient vehicle. If the determined object information satisfies an error condition, the determined object information will be added in the ambient object relation list of the main vehicle.

Through the aforementioned units and the aforementioned ambient object relation lists, a dynamic driving information graph can be established in real time by integrating relative positioning or absolute positioning, various vehicle detected information and the communication between vehicles.

Figure 2:
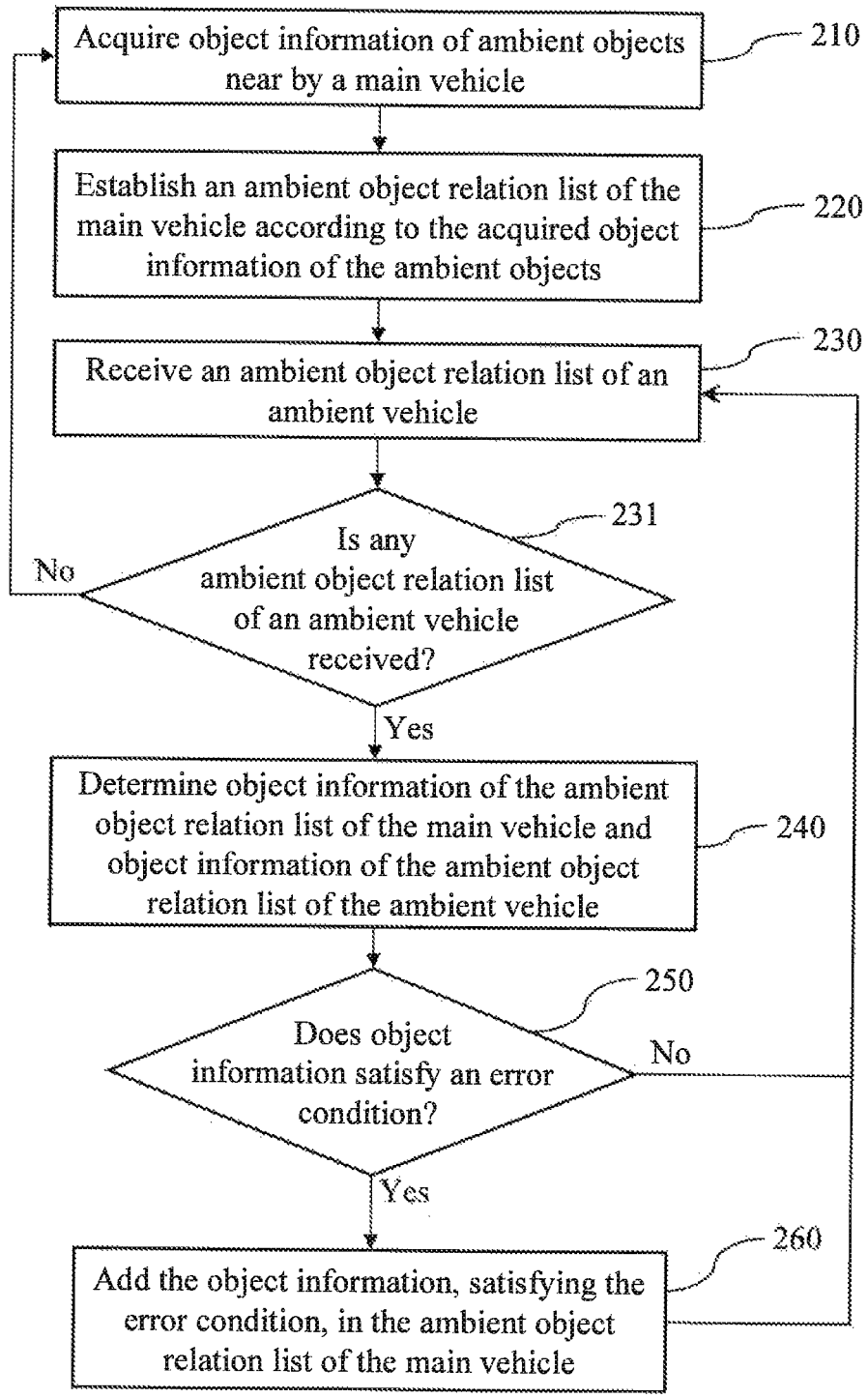
FIG. 2 is a flow chart of a generation method of dynamic driving information according to an embodiment of the disclosure.

FIG. 2 is a flow chart of a generation method of dynamic driving information according to an embodiment of the disclosure. Firstly, object information of ambient objects near by a main vehicle is acquired (step 210). Subsequently, according to the acquired object information of the ambient objects, an ambient object relation list of the main vehicle is established (step 220). Ambient object relation lists of the ambient vehicles are received (step 230). In step 230, if there is not any ambient vehicle, the main vehicle will not receive any ambient object relation list from an ambient vehicle. Herein, steps 240 to step 260 will not be performed.

After step 230, whether any ambient object relation list of an ambient vehicle is received is determined (step 231). If an ambient object relation list of an ambient vehicle is received, steps 240 to 260 are further performed. Otherwise, the procedure returns to step 210 to detect ambient objects.

In this embodiment, the object information is acquired before the ambient object relation list of the main vehicle is established. In some embodiments, the ambient object relation list of the ambient vehicle is received before the ambient object relation list of the main vehicle is established.

Each of the object information of the ambient object relation lists of the main vehicle and the ambient vehicle includes an angle and a distance obtained by sensors. Such object information can be set as an identification code. In some embodiments, the object information only including an angle or only including a distance is set as an identification code.

Besides angle and distance, the object information further includes a driving direction, time and a driving speed.

After the ambient object relation list of the main vehicle is established and the ambient object relation list of the ambient vehicle is acquired, the processing unit 150 determines object information of the ambient object relation list of the main vehicle and object information of the ambient object relation list of the ambient vehicle (step 240). In step 240, each piece of object information in the ambient object relation list of the ambient vehicle is set as an identification code. The identification code is used for comparing with one piece of the object information of the ambient object relation list of the main vehicle.

When the object information, including, for example, an angle and a distance, satisfies an error condition (step 250), the objects specified by the object information satisfying the error condition will be considered as the same object. Otherwise, the objects specified by the object information dissatisfying the error condition will be considered as different objects. The object information is further added in the ambient object relation list of the main vehicle (step 260), and the object specified by the object information is shown on the dynamic driving information graph.

In some embodiments, step 250 is not performed, and the object information of the ambient object relation list of the ambient vehicle is directly added in the ambient object relation list of the main vehicle to complete the dynamic driving information graph. The dynamic driving information graph can be a panorama picture.

Specifically, step 210 is described as follows. Initially, it is required for a main vehicle to establish an ambient object relation list, so that the assistance system requires sensors to detect a distance and angle of each ambient object. Generally, such sensors may be disposed in the assistance system. When the main vehicle has sensors and signals generated by the sensors are transmitted to the assistance system, the assistance system will establish the ambient object relation list according to the signals generated by the sensors disposed in the main vehicle. Herein, the processing unit receives the signals to perform subsequent procedures.

In step 230, the ambient object relation list of the ambient vehicle can be acquired through two manners. One manner is the active broadcast, and the other one is the request and response.

For the active broadcast, the main vehicle and ambient vehicles regularly broadcast their ambient object relation list. After synchronizing the main vehicle and an ambient vehicle, the main vehicle detects a distance and angle between the main vehicle and the ambient object via sensors to establish the ambient object relation list of the main vehicle. After establishing the ambient object relation list of the main vehicle, the main vehicle regularly broadcasts its ambient object relation list to the ambient vehicle.

For the request and response, the main vehicle similarly detects a distance and angle between the main vehicle and an ambient object via sensors to establish the ambient object relation list of the main vehicle. Subsequently, the main vehicle sends out a request for ambient object relation list, and an ambient vehicle receiving the request for ambient object relation list sends a response message carrying an ambient object relation list of the ambient vehicle to the main vehicle. The main vehicle receives the ambient object relation list of the ambient vehicle via the wireless communication unit 120.

Finally, the main vehicle establishes a dynamic driving information graph according to its ambient object relation list and the received ambient object relation list of the ambient vehicle.

In step 250, one piece of object information in the ambient object relation list of the main vehicle and one piece of object information in the ambient object relation list of the ambient vehicle may specify the same object (vehicle). If the different objects (vehicles) are considered because the sensed angles or distances are different, the dynamic driving information graph will show a plurality of objects (vehicles). When vehicles in the error range are considered as the same vehicle, the dynamic driving information graph will be established accurately.

In the ambient object relation list of the disclosure, object information of ambient vehicles near by the main vehicle is included. The object information is mainly obtained by detection and includes angle and distance. Angle represents that an ambient object is associated with the main vehicle, and distance represents how far an ambient object is from the main vehicle. In this and some embodiments, the object information further includes a driving direction of an ambient vehicle, a speed of the ambient vehicle, and time which the ambient vehicle is detected.

Figure 3:
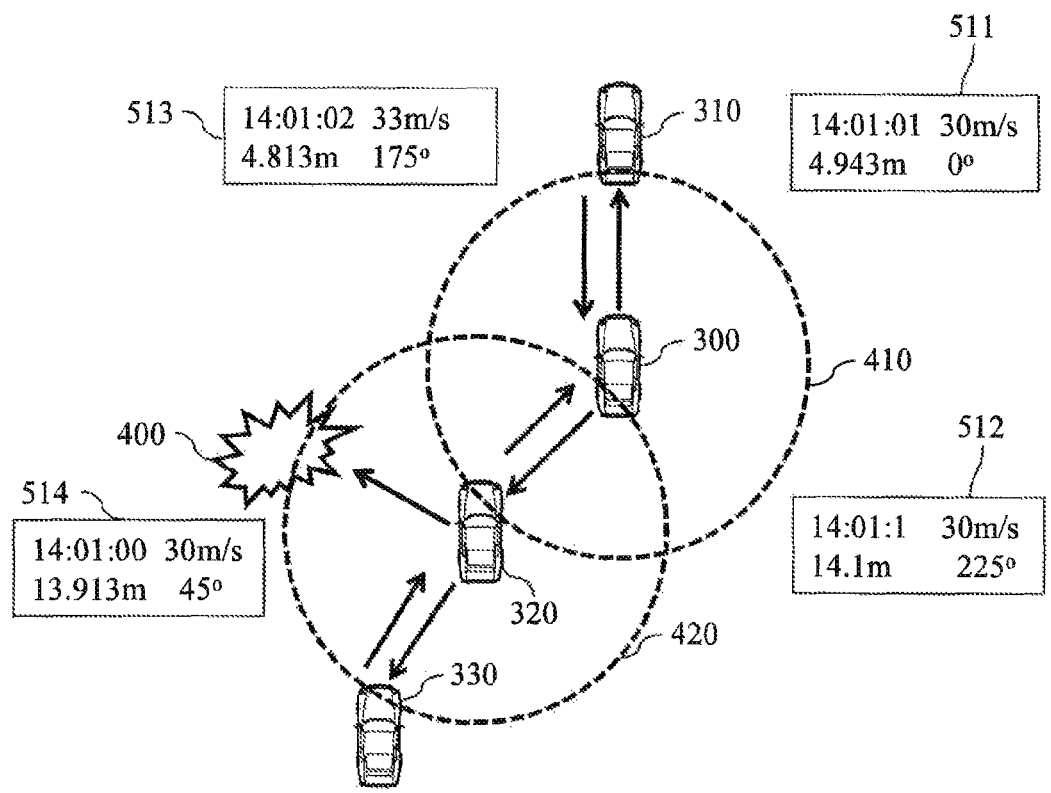
FIG. 3 and FIG. 4 show a procedure of establishing a dynamic driving information graph.

Hereinafter, four vehicles, i.e. the vehicles 300, 310, 320 and 330, and one barrier are taken as an example to illustrate the procedure of establishing a dynamic driving information graph, as shown in FIG. 3. Assume that the vehicle 300 is a main vehicle, that the vehicles 310, 320 and 330 are ambient vehicles near by the main vehicle, that the vehicles 300 to 330 move toward the north, and that time of the vehicles 300 to 330 is synchronized.

Each of the vehicles 300, 310, 320 and 330 has sensors to detect ambient objects. The sensing range of the vehicle 300 is a sensing region 410, and the sensing range of the vehicle 320 is a sensing region 420. The vehicle 300 senses that the vehicle 310 and the vehicle 320 are respectively in front of and in back of the vehicle 300, and then establishes its ambient object relation list of the main vehicle. The vehicle 320 senses that the vehicle 300 is in front of the right, that the vehicle 330 is in back of the left, and that a barrier 400 like a vehicle is in front of the left, and establishes its ambient object relation list of the main vehicle.

After obtaining object information, e.g. at least one of distance and angle, of ambient vehicle (or ambient object), all the vehicles 300 to 330 share all the object information, and set the object information as an identification code. The identification code including the object information is used for establishing a dynamic driving information graph.

Currently, each vehicle considers what has been detected, as sure information inside. In FIG. 3, the object information 511 and the object information 512 are sensed by the vehicle 300. The object information 511 is related to the vehicle 310, and the object information 512 is related to the vehicle 320. The object information 513 and the object information 514 are received. The object information 513 is related to the vehicle 310, and the object information 514 is related to the vehicle 320.

In step 240, assume that a distance error (one part of an error condition) is set as 2 m and that an angle error (the other part of the error condition) is set as 180°±15°, the difference between the distance, i.e. 4.943 m, of the object information 511 and the distance, i.e. 4.813 m, of the object information 513 is equal to 0.13 (4.943 4.813=0.13) and is less than the distance error. Similarly, the difference between the angle, i.e. 175 degree, of the object information 511 and the angle, i.e. 0 degree, of the object information 513 is equal to 175 degree (175°−0°=175°) and is less than the angle error. Herein, the object information 513 and the object information 511 specify the same vehicle, so that the processing unit 150 adds the object information 513 in the ambient object relation list owned by the vehicle 300.

In the same way, the distance between the distance, i.e. 14.1 m, of the object information 512 (the object information) and the distance, i.e. 13.913 m, of the object information 514 is equal to 0.187 (14.1-13.913=0.187) and is less than the distance error, and the angle, i.e. 225 degree, of the object information 512 and the angle, i.e. 45 degree, of the object information 514 is equal to 180 degrees (225°−45°=180°) and is less than the angle error. Herein, the object information 512 and the object information 514 specify the same vehicle, so that the processing unit 150 adds the object information. 514 in the ambient object relation list owned by the vehicle 300.

Therefore, after the distance and angle are determined, whether the detected information is really a received one can be ensured. For example, the vehicle 300 can consider the object information, send by the vehicle 310, as a received one and then set the object information as an identification code.

Figure 4:
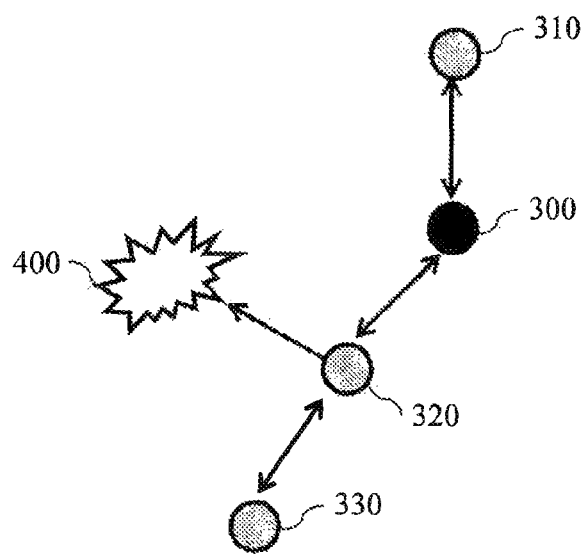

Subsequently, the ambient object relation list outputted by the vehicle 320 is added in the ambient object relation list of the vehicle 300, so the dynamic driving information graph is further established as shown in FIG. 4. The dynamic driving information graph can panoramically show the main vehicle and the ambient vehicles detected by the main vehicle, and can further panoramically show vehicles specified by the ambient object relation list of the ambient vehicle. The main vehicle can learn the locations of the ambient objects and further learn the locations of the objects specified by the ambient object relation list of the ambient vehicle. Vehicles out of user's view angle can be shown via the assistance system in the disclosure, thereby reducing the risk of driving.

The assistance system of dynamic driving information and the generation method of dynamic driving information in the disclosure are applied to the vehicle having the ambient vehicle sensing unit, and continuously detect the distance and angle of ambient object to establish an ambient object relation list. Every main vehicle can wirelessly broadcast its ambient object relation list to its ambient vehicles, and can wirelessly receive the ambient object relation list from its ambient vehicles. After determining the object information such as distance, angle or time, the main vehicle may draw a panoramic picture for the dynamic driving information graph. In the disclosure, the detected object information of various vehicles and the communication between vehicles can be employed to establish a dynamic driving information graph in real time, so as to provide dynamic vehicle states outside driver's view. Therefore, the assistance system can be configured to ensure driving safety.

What is claimed is:

1. An assistance system of dynamic driving information, applied to a main vehicle and comprising:
    an ambient vehicle sensing unit, configured to sense at least one ambient object near by the main vehicle to obtain first object information;
    a wireless communication unit, configured to receive an auxiliary ambient object relation list from at least one ambient vehicle; and
    a processing unit, configured to establish an main ambient object relation list according to the first object information and add second object information of the auxiliary ambient object relation list-into the main ambient object relation list to generate a dynamic driving information graph;

wherein the processing unit determines the first object information in the main ambient object relation list and the second object information in the auxiliary ambient object relation list; an object specified by both the first object information and the second object information is shown in the dynamic driving information graph when the first object information and the second object information satisfy an error condition; and various objects respectively specified by the first object information and the second object information are shown in the dynamic driving information graph when the first object information and the second object information do not satisfy the error condition.

2. The assistance system according to claim 1, further comprising a display unit, coupled to the processing unit and configured to display the dynamic driving information graph.

3. The assistance system according to claim 1, further comprising a memory unit, coupled to the processing unit and configured to store the main and auxiliary ambient object relation lists and the first and second object information thereof.

4. The assistance system according to claim 1, wherein the ambient object is a vehicle or a barrier.

5. The assistance system according to claim 1, wherein the first and second object information comprise angles and distances.

6. The assistance system according to claim 5, wherein the first and second object information further comprise driving directions, times and driving speeds.

7. A generation method of dynamic driving information, comprising:
   acquiring first object information of at least one ambient object near a main vehicle;
   establishing a main ambient object relation list of the main vehicle according to the first object information;
   receiving an auxiliary ambient object relation list of at least one ambient vehicle; and
   adding second object information of the auxiliary ambient object relation list into the main ambient object relation list to generate a dynamic driving information graph;
   wherein after the step of receiving the auxiliary ambient object relation list of the at least one ambient vehicle, further comprising the following steps:
   determining the first object information in the main ambient object relation list and the second object information in the auxiliary ambient object relation list;
   if the first object information and the second object information satisfy an error condition, showing an object specified by both the first object information and the second object information in the dynamic driving information graph; and
   if the first object information and the second object information do not satisfy the error condition, showing various objects respectively specified by the first object information and the second object information in the dynamic driving information graph.

8. The generation method according to claim 7, wherein the first and second object information comprise angles and distances.

9. The generation method according to claim 7, wherein the first and second object information comprise-driving directions, times and driving speeds.

10. The generation method according to claim 7, wherein the ambient object is a vehicle or a barrier.

11. An assistance system of dynamic driving information, comprising:
   a wireless communication unit, configured to receive an auxiliary ambient object relation list from at least one ambient vehicle; and
   a processing unit, configured to receive first object information of at least one ambient object near a main vehicle to establish an main ambient object relation list of the main vehicle, and add second object information of the auxiliary ambient object relation list into the main ambient object relation list of the main vehicle to generate a dynamic driving information graph;
   wherein the processing unit determines the first object information in the main ambient object relation list and the second object information in the auxiliary ambient object relation list; an object specified by both the first object information and the second object information is shown in the dynamic driving information graph when the first object information and the second object information satisfy an error condition; and various objects respectively specified by the first object information and the second object information are shown in the dynamic driving information graph when the first object information and the second object information do not satisfy the error condition.

* * * * *